(12) United States Patent
King

(10) Patent No.: US 7,706,525 B2
(45) Date of Patent: Apr. 27, 2010

(54) SYSTEMS AND METHODS FOR SIDE-TONE NOISE SUPPRESSION

(75) Inventor: Jay King, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 887 days.

(21) Appl. No.: 09/968,579

(22) Filed: Oct. 1, 2001

(65) Prior Publication Data

US 2003/0063736 A1    Apr. 3, 2003

(51) Int. Cl.
*H04M 1/00*  (2006.01)
*H04M 9/00*  (2006.01)

(52) U.S. Cl. .................................... 379/392; 379/391

(58) Field of Classification Search ................ 379/391, 379/392
See application file for complete search history.

(56) References Cited

U.S. PATENT DOCUMENTS

| 4,943,807 A | * | 7/1990 | Early et al. ............... 341/120 |
| 5,640,450 A | * | 6/1997 | Watanabe ................. 379/392 |
| 5,752,226 A | * | 5/1998 | Chan et al. ............... 704/233 |

FOREIGN PATENT DOCUMENTS

WO    WO 9911045 A1 *  3/1999

* cited by examiner

*Primary Examiner*—Alexander Jamal

(57) ABSTRACT

A side-tone circuit comprises a microphone configured to generate a reverse link audio signal and a side-tone noise suppressor. The side tone noise suppressor is configured to receive the reverse link audio signal, suppress noise in the received reverse link audio signal, and output a noise suppressed side-tone signal. The side-tone noise circuit also includes a speaker configured to receive the noise suppressed audio signal and communicate it to a user.

6 Claims, 5 Drawing Sheets

SYSTEMS AND METHODS FOR SIDE-TONE NOISE SUPPRESSION

BACKGROUND OF THE INVENTION

1. Field of the Invention

The invention relates generally to voice communication and more particularly to systems and methods for side-tone noise suppression in a communication handset.

2. Background

In ordinary conversation, an individual speaker is accustomed to hearing the words they speak. This type of "feedback" provides certain queues to the speaker such as whether they are speaking loudly enough to be heard, what there tone is, etc. But when a speaker speaks into a telephone or other type of handset, e.g., a wireless communications handset, at least part of this feedback is blocked by the handset itself. This blocking can create an unnatural, and uncomfortable, experience for the speaker, because they do not receive the normal queues that allow them to evaluate how effectively they are communicating.

To compensate, communication handsets typically incorporate side-tone processing, which transfers a portion of the signal spoken by the user back into the handset earpiece. Thus, the side-tone signal replaces the normal feedback, which is blocked by the handset. In addition to providing normal communication queues as described above, the side-tone signal ensures the user that their handset is working and that they are speaking into, or loud enough for, the handset.

Unfortunately, however, current handsets do not filter out noise in the side-tone signal. Thus, if the speaker is in a noisy environment, the noise gets transferred to the speaker's ear. The noise can substantially degrade the effectiveness of the feedback because, for example, the user can no longer tell whether they are speaking loud enough. In fact, in such a situation, the user is likely to overcompensate for the noise they hear and speak too loudly into the handset. Also, the noise can interfere with the speaker's ability to hear the other party to the conversation. The result is an unpleasant experience for both parties. Moreover, the speaker is often forced to repeat himself, or is forced to ask the other party to repeat himself, which leads to increased talk time. Increased talk time is not only inconvenient, but for wireless communication handsets at least, is undesirable because it also drives up the charges incurred by the user.

The noise also gets transferred to the party on the other end of the call. As a result, conventional handsets typically include some mechanism whereby the noise is suppressed in the outgoing communication. But this noise suppression does not extend to the side-tone audio path in conventional handsets. Therefore, surrounding noise is still fed back to the user's ear, even in handsets with noise suppression on the outgoing communication, or reverse link.

SUMMARY OF THE INVENTION

Thus, it is an objective of the invention to eliminate or reduce noise in the side-tone audio signal that is fed back to the users ear. In one aspect of the invention, the systems and methods for side-tone noise suppression use a noise suppressor in side-tone audio processing path to reduce the level of noise in the side-tone audio signal to an acceptable level. As a result, the user is provided the queues normally provided by such feedback, which results in a more enjoyable experience for the user as well as the other party to the conversation. Moreover, the user's talk time is reduced thereby reducing the user's talk time, which can result in a significant cost savings to the user.

In one particular embodiment, existing noise suppression in the reverse link audio path is used to provide noise suppression to the side-tone audio path as well. In this manner, handset resources are reused in a manner that saves implementation costs for the manufacturer, thus imparting further benefit.

Other aspects, advantages, and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION OF THE PREFERRED EMBODIMENTS

Figure 1:
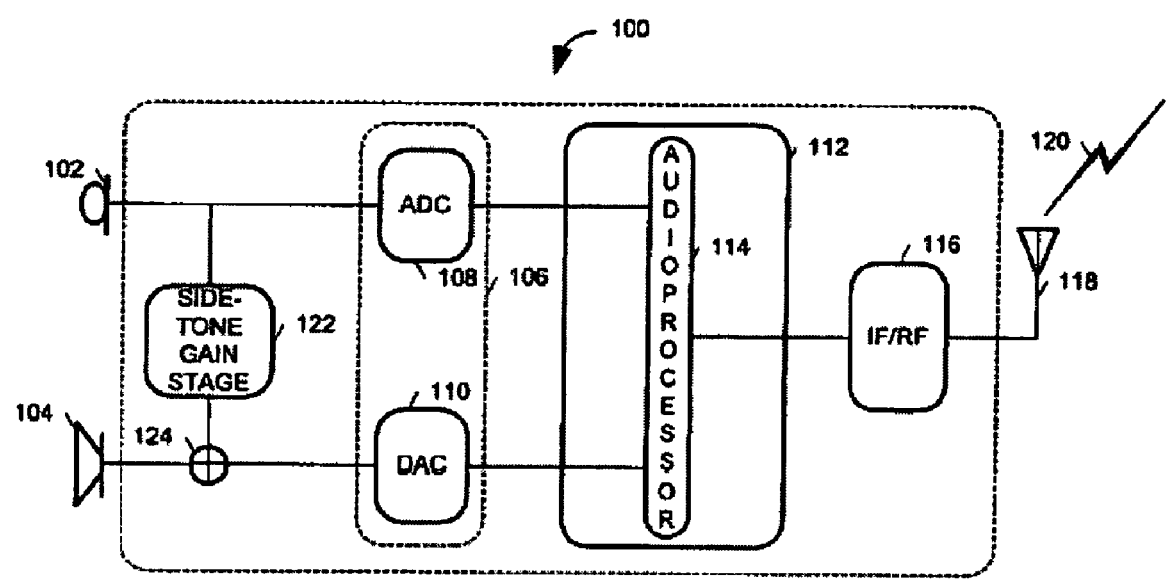
FIG. 1 is a functional block diagram illustrating an exemplary handset that includes a side-tone audio path in the analog domain.

FIG. 1 illustrates a wireless communication handset 100 that can be used for voice communication over a wireless communication channel 120. Handset 100 can be said to comprise two main audio paths, a reverse link audio path and a forward link audio path. The reverse link audio path starts with microphone 102. Microphone 102 receives acoustic waves that represent the user's spoken communication and converts them into an analog audio signal. The analog audio signal is preferably converted into a digital audio signal for further processing. Thus, microphone 102 is preferably connected with an Analog-to-Digital Converter (ADC) 108 that is configured to receive the analog audio signal and convert to a digital audio signal. ADC 108 is coupled with a processor 112, which is often referred to as a baseband processor. Baseband processor 112 receives the digital audio signal from ADC 108.

Baseband processor 112 can comprise a plurality of circuits configured to perform a variety of functions. Preferably, however, processor 112 will comprise audio processing circuitry such as audio processor 114, configured to perform such audio processing functions as compression, encoding, and frame generation. Alternatively, audio processor 114 can be external to baseband processor 112, but this has several disadvantages, such as increased chip count and assembly time. The processed audio signal is then sent to IF/RF circuit 116 where it is preferably converted to an analog signal and eventually modulated with an RF carrier for communication over channel 120 via antenna 118.

Thus, the reverse link audio path can, for example, comprise microphone 102, ADC 108, audio processor 114, and a portion of IF/RF circuit 116, which can be termed the transmit portion of IF/RF circuit 116.

The forward link audio path, on the other hand, comprises: a receive portion of IF/RF circuit 116, which can be configured to demodulate a communication received via antenna 118 and convert it to a digital audio signal; audio processor 114, which can be configured to decode the digital audio signal generated by IF/RF circuit 116; Digital-to-Analog Converter (DAC) 110, which can be configured to convert the decoded digital audio signal to an analog audio signal; and speaker 104, which can be configured to generate an audible signal from the analog audio signal and communicate it to the user.

Again, audio processor 114 can be external to baseband processor 112. Moreover, it is not required that the reverse link audio processing and forward link audio processing be incorporated in one circuit. These functions can, depending on the implementation, be included in separate circuits internal, or external, to baseband processor 112. Further, ADC 108 and DAC 110 can be included in one device 106. Such a device 106 is often referred to as an audio coder-decoder or CODEC. The reverse link audio path can also include an input audio amplifier (not shown) configured to amplify the analog audio signal generated by microphone 102 to a sufficient signal level before passing the amplified signal to ADC 108. Similarly, the forward link audio path can include an output audio amplifier (not shown) configured to amplify the analog audio signal generated by DAC 110 to a sufficient level before sending the amplified audio signal to speaker 104. If ADC 108 and DAC 110 are included in a CODEC 106, then the input audio amplifier (not shown) and/or the output audio amplifier (not shown) can be internal or external to CODEC 106.

Handset 100 also includes a side-tone audio path to route the reverse link audio back to speaker 204 in order to give the user a natural conversational experience, as described above. Thus, the input to the side-tone audio path is a reverse link audio signal that is picked off at some point along of the reverse link audio path. The side-tone audio path preferably comprises a single side-tone gain stage 122. Gain stage 122 is used to set the signal level of a side-tone audio signal produced by the side-tone audio path. In conventional handset designs, the signal level is generally between −10 dB and −30 dB; however, this can vary depending on the implementation. The side-tone audio signal is then summed with a forward link audio signal of the forward link audio path.

The side-tone audio path can be implemented in either the analog or digital domain. In FIG. 1, for example, the side-tone audio path is implemented in the analog domain. Thus, side-tone gain stage 122 can receive the analog audio signal generated by microphone 102. In the analog domain, side-tone gain stage 122 typically comprises a voltage divider configured to pick off a predetermined amount of signal energy from the reverse link audio signal. The amount of energy, and therefore the amount of signal fed to speaker 104, can be controlled by adjusting the voltage divider parameters. The side-tone audio signal generated by side-tone gain stage 122 can then be summed in adder 124 with the analog audio signal generated by DAC 110. The output of adder 124 is then sent to speaker 104

Figure 2:
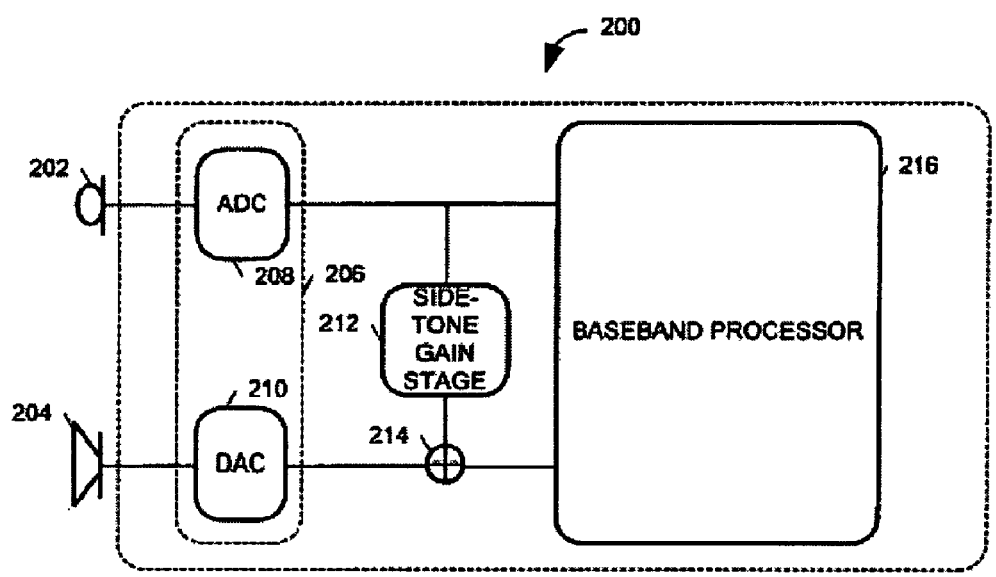
FIG. 2 is functional block diagram illustrating an exemplary handset that includes a side-tone audio path implemented in the digital domain.

Alternatively, FIG. 2 illustrates an example embodiment of a handset 200 in which a side-tone gain stage 212 is configured in the digital domain. Thus, microphone 202 generates an analog audio signal which is passed to ADC 208, which may or may not be included in a CODEC 206. ADC 208 converts the analog audio signal to a digital audio signal, which is sent to baseband processor 216. As can be seen, side-tone gain stage 212 also receives the digital audio signal generated by ADC 208. Side-tone gain stage 212 generates a digital side-tone audio signal with the requisite signal level. This side-tone audio signal is then summed with a digital forward link audio signal generated by baseband processor 216 in adder 214.

Processor 216 can include a central processing unit such as a microprocessor or microcontroller for executing the instructions stored in a memory (not shown), performing data manipulations, and controlling tasks in handset 200. Processor 216 can include one or more additional processors as well. Such additional processors can include an auxiliary processor to manage input/output, an auxiliary processor to perform floating point mathematical operations, a digital signal processor (DSP) (a special-purpose microprocessor having an architecture suitable for fast execution of signal processing algorithms), a back-end processor (a slave processor subordinate to the main processing system), an additional microprocessor or controller for dual or multiple processor systems, or a coprocessor. These additional processors may be discrete processors or may be built in to baseband processor 216.

Preferably processor 216 does in fact include a DSP for performing audio processing functions, such as those described in conjunction with audio processor 114. In this case, the side-tone audio path is preferably implemented in the DSP. Thus, side-tone gain stage 212 preferably comprises instructions for configuring the DSP to generate a side-tone audio signal comprising the requisite signal strength. The function of summing the side-tone audio signal and the forward link audio signal, i.e., adder 214, is also preferably executed by the DSP.

As discussed above, however, whether the side-tone audio path is executed in the analog or digital domain, noise in the reverse link audio signal is fed back to the user as part of the side-tone audio signal. The systems and methods for side-tone noise suppression use a noise suppression stage to filter out such noise from the side-tone audio signal.

Figure 3:
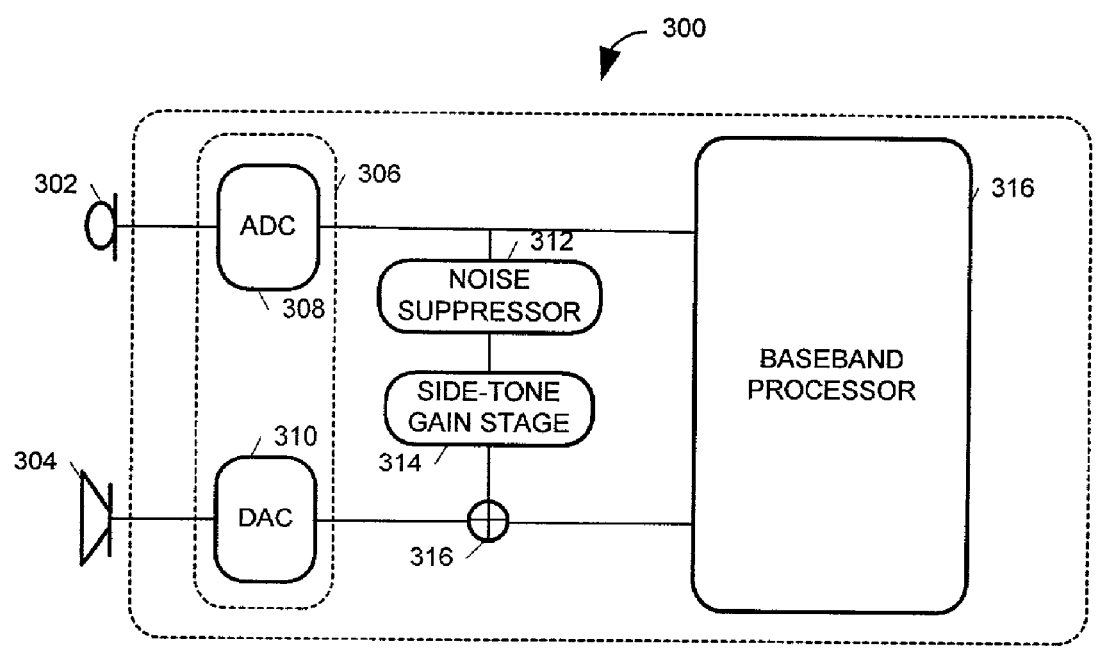
FIG. 3 is a functional block diagram illustrating an example embodiment of a handset that includes a noise suppressor in the side-tone audio path in accordance with the invention.

Accordingly, FIG. 3 illustrates an example embodiment of a handset 300, designed in accordance with the systems and methods for side-tone noise suppression, that includes a noise suppression stage 312 in a side-tone audio path implemented in the digital domain. Preferably, the side-tone audio path, including noise suppression stage 312, is implemented in a DSP as described above. But nothing in the descriptions of the following examples is intended to limit the use of the noise suppression techniques described herein to DSP implementations or even to implementations in the digital domain. With this in mind, the operation of noise suppression stage 312 will be described as a way to illustrate the systems and methods for side-tone noise suppression. It will be understood that other embodiments, some of which will be described herein, are possible with the appropriate implementation modifications.

Noise suppression stage 312 is configured to receive a digital audio signal generated by ADC 308 from an analog audio signal generated by microphone 302. Noise suppression stage 312 is then configured to suppress any noise components included in the digital audio signal before passing the signal to side-tone gain stage 314. It will be understood that the order of noise suppression stage 312 and side-tone gain stage 314 can be reversed, although the order illustrated in FIG. 3 is preferred for various performance reasons. Thus, side-tone gain stage 314 will output a noise suppressed side-tone audio signal comprising the appropriate signal level. The noise suppressed side-tone audio signal is then summed with a forward link audio signal generated by baseband processor 318 in adder 316. The output of adder 316 is then sent to DAC 310, which generates an analog signal that is communicated to the user via speaker 304.

Noise suppression stage 312 can be implemented in hardware or software or can comprise a combination of hardware and software filtering techniques. A common technique used for noise suppression is to attenuate signal content that does not vary significantly in signal level over time. Voice signals are very dynamic in terms of signal level over time. Therefore, signal content that does not vary significantly is assumed to be noise. To differentiate the voice and noise content, the signal is often converted to the frequency domain to allow for spectral analysis. If a portion of the spectrum does not vary significantly in level over time, then that portion of the spectrum is attenuated prior the signal being converted back to the time domain. Again, noise suppression stage 312 is preferably implemented in a DSP. Therefore, the above filtering approach, or equivalent, is preferably implemented in a DSP as part of noise suppression stage 312.

Figure 4:
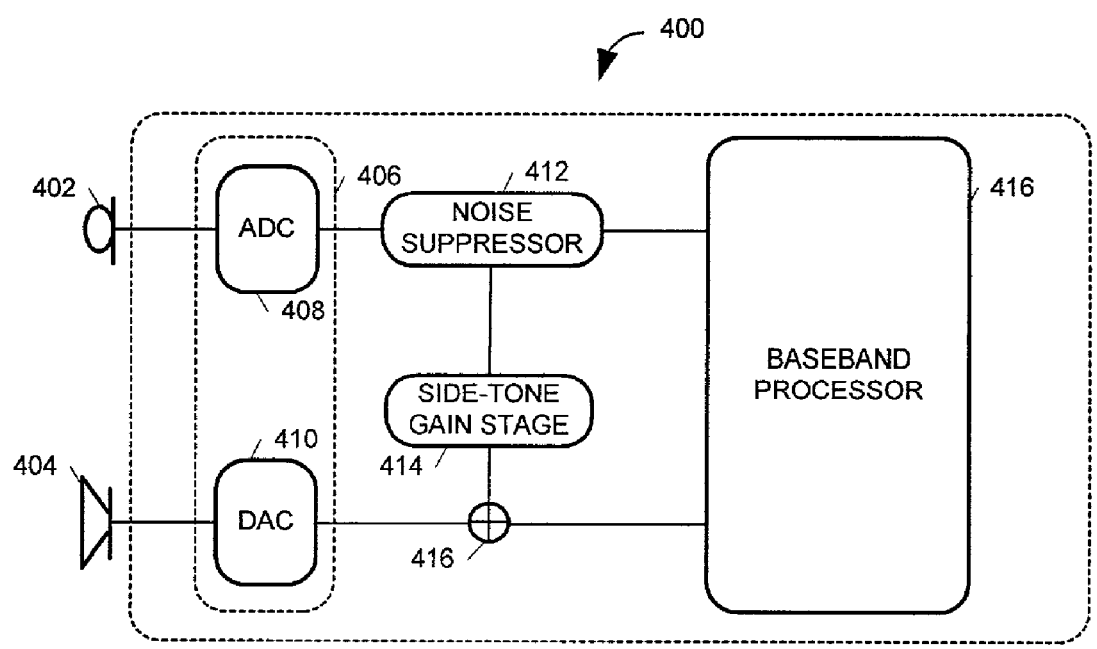
FIG. 4 is a functional block diagram illustrating another example embodiment of a handset in which the noise suppressor is also part of the reverse link audio path in accordance with the invention.

FIG. 4 illustrates an alternative example embodiment of a handset 400 comprising a noise suppression stage 412 configured to filter out noise as described above. In handset 400, however, noise suppression stage 412 is part of the reverse link audio path. As mentioned, it is the reverse link audio signal that comprises noise, which degrades the side-tone audio signal. But the noise also degrades the reverse link audio signal. Therefore, the reverse link audio signal will also need to be filtered so as to remove these noise components before it is transmitted by handset 400. By placing noise suppression stage 412 in the reverse link audio path, duplication of resources can be eliminated by using the same noise suppression stage 412 to suppress the noise in both the reverse link audio signal and the side-tone audio signal.

Accordingly, noise suppression stage 412 can be configured to receive a digital audio signal from ADC 406, which is generated from an analog audio signal supplied by microphone 402, and to generate a noise suppressed audio signal that is sent to baseband processor 418 and to side-tone gain stage 414. Side-tone gain stage 414 is then preferably configured to output a noise suppressed side-tone audio signal comprising the appropriate signal level that is then summed with a forward link audio signal from baseband processor 418 in adder 416. The output of adder 416 is then preferably converted to an analog audio signal by DAC 410 and communicated to a user via speaker 404.

Figure 5:
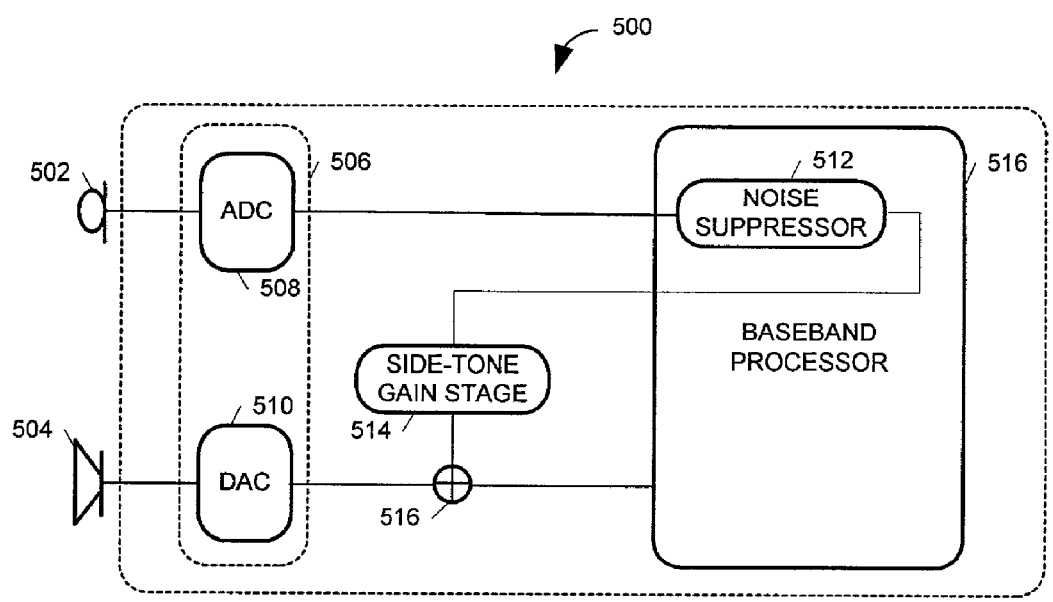
FIG. 5 is a functional block diagram illustrating another example embodiment of a handset in which a single noise suppressor is used for both the reverse link audio path and the side-tone audio path in accordance with the invention.

As mentioned previously, the reverse link audio path will often include a noise suppressor. FIG. 5 illustrate a handset 500 in which noise suppressor 512 is included in the reverse link audio processing portion of baseband processor 516. As with previous embodiments, a second noise suppressor can be included in the side-tone audio path of handset 500 either prior to or following side-tone gain stage 514; however, this duplication is a waste of resources that drives up the implementation costs of handset 500. For example, using two noise suppressors can require increased components at increased costs, increased chip area, and/or increased processing power. Therefore, it is preferable that noise suppressor 512 be used to suppress noise in both the reverse link audio path and the side-tone audio path. In handset 500, this is accomplished by judiciously choosing where the side-tone audio path picks off the reverse link audio signal. By picking of the reverse link audio signal after noise suppressor 512, it can be "reused" for noise suppression in both audio paths.

While noise suppressor 512 is shown internal to processor 512, it will be understood that noise suppressor 512 can be external or internal to processor 512 and can be implemented in hardware, firmware, software, or a combination thereof. Regardless of the manner of implementation, however, beneficial reuse of existing noise suppression resources within handset 500 provides added benefit by eliminating excess implementation costs such as those described above.

Each of the example embodiments described above illustrate example Systems and methods in which a side-tone audio path in a handset is configured to pick off a reverse link audio signal, suppress noise components in the reverse link audio signal, and direct a portion of the noise suppressed signal back to the speakers ear through the handset's earpiece. In so doing, these examples illustrate how the systems and methods for side-tone noise suppression improve the quality of the side-tone audio signal. As a result of the improved quality, the user's satisfaction is increased and their talk time is decreased, which can result in significant cost savings to the user. Therefore, not only is the user's, as well as the other party's, experience enhanced, but a cost savings is also imparted on them. Moreover, by judiciously selecting where the reverse link audio signal is picked off, noise suppression resources can be reused resulting in implementation costs savings as well.

Although the preceding discussion relates general to wireless communication handsets, it will be apparent that the systems and methods described herein are equally applicable to any device that comprises a side-tone audio signal path. For example, a cordless phone or a Personal Digital Assistant (PDA) equipped for voice communication can also use the systems and methods described herein. Accordingly, the preceding embodiments are provided as examples and should not be seen as limiting the invention to any particular device or application. Moreover, while the term handset is used in the preceding descriptions to refer to a wireless communication handset, use of the term handset in this fashion is not intended to exclude from the scope of the descriptions, or the claims that follow, any other type of communication handset.

While embodiments and implementations of the invention have been shown and described, it should be apparent that many more embodiments and implementations are within the scope of the invention. Accordingly, the invention is not to be restricted, except in light of the claims and their equivalents.

What is claimed is:

1. A side-tone circuit, comprising:
   a single microphone configured to generate a reverse link audio signal having environmental noise components and voice components in an audio band;
   an analog to digital converter (ADC) configured to convert the reverse link audio signal to a digital reverse link audio signal;
   a side-tone noise suppressor configured to:
      receive the digital reverse link audio signal,
      differentiate, based on the variability of signal levels over time, the audio band environmental noise components and the audio band voice components using only the digital reverse link audio signals; and
      suppress the audio band environmental noise components that do not vary significantly in signal level over time and pass the audio band voice components to generate a digital noise suppressed side-tone signal;
   a summing circuit configured to combine the digital noise suppressed side-tone signal with a forward link audio signal to generate a digital output signal;

a digital to analog converter (DAC) configured to convert the digital output signal to an analog output signal; and a speaker configured to communicate the analog output signal to a user.

2. A communication device, comprising:

a forward link audio path;

a reverse link audio path comprising:

a single microphone configured to generate a reverse link audio signal having environmental noise components and voice components in an audio band; and an analog to digital converter (ADC) configured to convert the reverse link audio signal to a digital reverse link audio signal;

a side-tone audio path comprising a side-tone noise suppressor configured to:

receive the digital reverse link audio signal, differentiate, based on the variability of signal levels over time, the audio band environmental noise components and the audio band voice components using only the digital reverse link audio signal; and suppress the audio band environmental noise components that do not vary significantly in signal level over time and pass the audio band voice components to generate a digital noise suppressed side-tone signal;

a summing circuit configured to combine the digital noise suppressed side-tone signal with a forward link audio signal from the forward link audio path to generate a digital output signal;

a digital to analog converter (DAC) configured to convert the digital output signal to an analog output signal; and a speaker configured to communicate the analog output signal to a user.

3. A method of side-tone noise suppression comprising:

generating a reverse link audio signal with no more than one microphone, the reverse link audio signal having environmental noise components and voice components in an audio band;

converting the reverse link audio signal to a digital reverse link audio signal with an analog to digital converter (ADC);

receiving the digital reverse link audio signal;

differentiating, based on the variability of signal levels over time, the audio band environmental noise components and the audio band voice components using only the digital reverse link audio signal;

generating a digital noise suppressed side-tone signal by suppressing the audio band environmental noise components that do not vary significantly in signal level over time and passing the audio band voice components;

combining, with a summing circuit, the digital noise suppressed side-tone signal and a forward link audio signal to generate a digital output signal;

converting the digital output signal to an analog output signal with a digital to analog converter (DAC); and communicating the analog output signal to a user with a speaker.

4. The side-tone circuit of claim 1, further comprising a side-tone gain circuit coupled with the side-tone noise suppressor, the side-tone gain circuit configured to set the signal power level for the noise suppressed side-tone signal.

5. The communication device of claim 2, wherein the side-tone audio path further comprises a side-tone gain circuit coupled with the side-tone noise suppressor, the side-tone gain circuit configured to set the signal power level for the noise suppressed side-tone signal.

6. The method of claim 3, further comprising:

selling the signal power level for the noise suppressed side-tone signal with a side-tone gain circuit.

\* \* \* \* \*